(12) United States Patent
Shinohara

(10) Patent No.: US 9,354,419 B2
(45) Date of Patent: May 31, 2016

(54) ADJUSTMENT DEVICE, LENS BARREL, AND OPTICAL APPARATUS

(75) Inventor: Mitsuru Shinohara, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1131 days.

(21) Appl. No.: 13/331,247

(22) Filed: Dec. 20, 2011

(65) Prior Publication Data

US 2012/0154926 A1    Jun. 21, 2012

(30) Foreign Application Priority Data

Dec. 20, 2010   (JP) ................................ 2010-283122
Nov. 25, 2011   (KR) ........................ 10-2011-0124468

(51) Int. Cl.
| | |
|---|---|
| G02B 15/02 | (2006.01) |
| G02B 7/00 | (2006.01) |
| G02B 15/10 | (2006.01) |
| G02B 15/06 | (2006.01) |

(52) U.S. Cl.
CPC ................ *G02B 7/003* (2013.01); *G02B 15/06* (2013.01); *G02B 15/10* (2013.01)

(58) Field of Classification Search
CPC ................................ G02B 15/10; G02B 15/06
USPC .................. 359/672, 811, 813, 819, 822, 823
See application file for complete search history.

(56) References Cited

U.S. PATENT DOCUMENTS

| | | | |
|---|---|---|---|
| 6,710,937 B2 | 3/2004 | Lee et al. | |
| 2002/0030896 A1 | 3/2002 | Lee et al. | |
| 2002/0067552 A1* | 6/2002 | Tanabe et al. | 359/699 |

FOREIGN PATENT DOCUMENTS

| | | |
|---|---|---|
| CN | 1335524 | 2/2002 |
| CN | 2927086 | 7/2007 |
| JP | 60-70815 | 5/1985 |
| JP | 05-088092 | 4/1993 |
| JP | 05-276309 | 10/1993 |
| JP | 2001-222081 | 8/2001 |
| JP | 2002-196205 | 7/2002 |
| JP | 3792875 | 4/2006 |

OTHER PUBLICATIONS

Extended European Search Report issued Apr. 5, 2012 in EP Application No. 11194595.2.
Chinese Office Action dated Jan. 26, 2015 from Chinese Patent Application No. 201110438941.X, 24 pages.

* cited by examiner

*Primary Examiner* — James Greece
(74) *Attorney, Agent, or Firm* — Staas & Halsey LLP

(57) ABSTRACT

An axis adjustment device, which may adjust an optical axis mismatch of an optical device at a high precision, and may perform an axis adjustment operation, includes a holding member to hold an optical device, a support member to support the holding member so that the holding member moves within a facing surface, a first rotating member to hold the holding member and rotatably supported around a first point S1 formed at a surface facing the support member, and a second rotating member to hold the holding member and to be rotatably supported around a second point formed at the surface facing the support member. The holding member moves within the surface facing the support member due to a rotation of one of the first and second rotating members and in order to adjust a relative position in a direction orthogonal to an optical axis of the optical device.

17 Claims, 5 Drawing Sheets

ADJUSTMENT DEVICE, LENS BARREL, AND OPTICAL APPARATUS

CROSS-REFERENCE TO RELATED APPLICATIONS

This application claims priority under 35 U.S.C. §119(a) from Japanese Patent Application No. 2010-283122, filed on Dec. 20, 2010 with the Japanese Intellectual Property Office, and Korean Patent Application No. 10-2011-0124468, filed on Nov. 25, 2011, with the Korean Intellectual Property Office, the disclosures of each which are incorporated herein by reference.

BACKGROUND OF THE INVENTIVE CONCEPT

1. Field of the Inventive Concept

The present general inventive concept relates to an adjustment device to adjust a relative position in a direction orthogonal to an optical axis of an optical device such as a lens or the like, a lens barrel including the adjustment device, and an optical apparatus including the lens barrel.

2. Description of the Related Art

Among a plurality of lenses arranged in a lens barrel, an inner focus type zoom lens is to move a zoom lens (a variator) and a focus lens in an optical axis in order to perform zooming and focusing.

The inner focus type zoom lens has a total length, which is not changed by focusing and is made small and light. Therefore, the inner focus type zoom lens is widely used in an optical apparatus such as a photographing apparatus including a digital video camera, a digital still camera, etc., or an image projecting apparatus including a projector, etc.

In a conventional zoom lens, some lenses of a plurality of lenses arranged in the lens barrel are supported by a lens holding member. A lens axis adjustment device is provided which performs the adjustment of a relative position of the lens holding member in a direction orthogonal to an optical axis so that the adjustment of an optical axis mismatch (hereinafter, axis adjustment) of lenses may be performed when the lens holding member is inserted into the lens barrel. Examples of a conventional axis adjustment device are described in Patent Publication 3792875, and Patent Laid-open Publication No. 2002-196205.

However, conventional lens axis adjustment devices have a disadvantage in that when the adjustment device is removed after the adjustment, the lens holding member moves in a direction in which stress applied to the lens holding member is relieved.

Additionally, conventional lens axis adjustment devices consist of three or more adjustable parts in order to adjust an optical axis mismatch. Accordingly, an axis adjustment operation of a conventional lens axis adjustment device is complicated.

SUMMARY OF THE INVENTIVE CONCEPT

The present general inventive concept provides an adjustment device, which has a simple structure to adjust a mismatch between an optical device and an optical axis at a high precision and easily perform an adjustment work, a lens barrel including the adjustment device, and an optical apparatus including the lens barrel.

Additional features and utilities of the present general inventive concept will be set forth in part in the description, which follows and, in part, will be obvious from the description, or may be learned by practice of the general inventive concept.

The foregoing and/or other features and utilities of the present general inventive concept may be achieved by providing an adjustment device. The adjustment device may include: a holding member to hold an optical device; a support member to face the holding member, and to support the holding member so that the holding member moves within a surface facing the support member; a first rotating member to face the support member, and to be supported rotatably around a first point provided on a surface facing the support member, with holding the holding member; and a second rotating member to face the support member, and to be supported rotatably around a second point provided on a surface facing the support member, with holding the holding member, wherein the holding member moves within a surface facing the support member according to the rotation operation of anyone of the first and second rotating members, so that a relative position adjustment is performed in a direction orthogonal to an optical axis of an optical device.

As described above, in an adjustment device according to the present general inventive concept, a holding member moves within a surface facing a support member due to a rotation of one of first and second rotating members. Therefore, the adjustment device may adjust a relative position in a direction orthogonal to an optical axis of an optical device at a high precision. Also, the adjustment device may easily perform this adjustment work.

Therefore, according to the present general inventive concept, a lens barrel including the adjustment device and an optical apparatus including the lens barrel may be provided.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
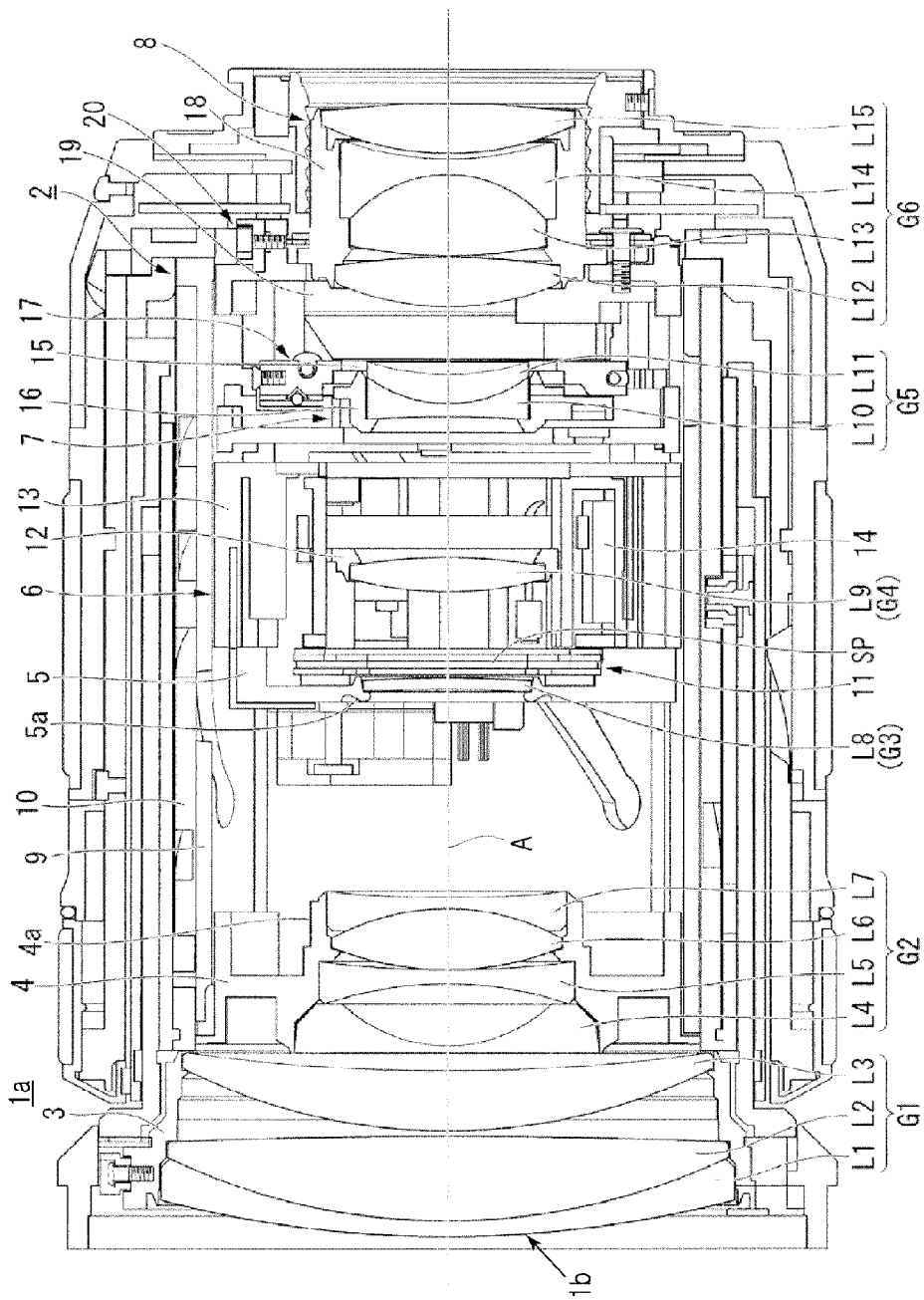
FIG. 1 is a cross-sectional view illustrating an internal structure of an interchangeable lens according to an exemplary embodiment.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

Hereinafter, an adjustment device, a lens barrel, and an optical apparatus according to the present general inventive concept will be described in detail with reference to the attached drawings.

In at least one exemplary embodiment, an interchangeable lens 1a (i.e., an optical apparatus) is illustrated in FIG. 1. The interchangeable lens 1a may be used, for example, with a single-lens reflex (SLR) camera, as discussed further below. Although a SLR camera is referred to hereinafter, the interchangeable lens 1a may be used with various photographing devices including, but not limited to, a lens shutter camera, a digital camera, a video camera, etc., an optical apparatus including an image projecting apparatus such as a projector, and a lens barrel including the optical apparatus.

FIG. 1 is a cross-sectional view illustrating an internal structure of the interchangeable lens 1a according to an exemplary embodiment. As shown in FIG. 1, the interchangeable lens 1a may include an inner focus-type zoom lens 1b. More specifically, the interchangeable lens 1a includes a lens barrel 2. The lens barrel supports a plurality of lenses (L1 through L15) arranged along an optical axis (A). The plurality of lenses L1 through L15 of the lens barrel 2 may constitute the inner-focus type zoom lens 1b. Although at least one exemplary of the present general inventive concept includes 15 lenses, another number of lens may be included.

The inner focus-type zoom lens 1b includes first through sixth lens groups G1 through G6, which are arranged sequentially from an object side. For example, the lens groups G1-G6 may be arranged sequentially from a front of the interchangeable lens 1. The first lens group G1 includes the lenses L1, L2, and L3, the second lens group G2 includes the lenses L4, L5, L6, and L7, and the third lens group G3 includes the lens L8. The fourth lens group G4 includes the lens L9, the fifth lens group G5 includes the lenses L10 and L11, and the sixth lens group G6 includes the lenses L12, L13, L14, and L15. Also, an aperture SP is disposed between the third and fourth lens groups G3 and G4. An opening of the aperture SP may be adjusted, as described in greater detail below.

The inner focus-type zoom lens 1b moves the second through sixth lens groups G2 through G6 in the optical axis with respect to the first lens group G1 to perform zooming and moves the fourth lens group G4 in the optical axis to perform focusing.

The inner focus-type zoom lens 1b moves the fifth lens group G5 in a direction orthogonal to the optical axis to stabilize image shaking caused by hand shaking, etc. Also, the structure of the inner focus-type zoom lens 1b is not limited to 15 lenses of the six lens groups, but the number of lenses or combinations thereof may be appropriately changed.

The lens barrel 2 may further include first, second, third, fourth, fifth, and sixth lens holding members 3, 4, 5, 6, 7, and 8. The first lens holding member 3 includes the first lens group G1, the second lens holding member 4 includes the second lens group G2, the third lens holding member 5 includes the third lens group G3, the fourth lens holding member 6 includes the fourth lens group G4, the fifth lens holding member 7 includes the fifth lens group G5, and the sixth lens holding member 8 includes the sixth lens group G6. The lens barrel 2 may also include a fixed barrel 9, and a cam barrel 10. The fixed barrel 9 houses the second through sixth lens holding members 4 through 8. The cam barrel 10 is installed on an outer surface of the fixed barrel 9 and is rotatable in a circumferential direction.

The first lens holding member 3 is installed in front of the fixed barrel 9, and includes the first lens group G1. The first lens holding member 3 may be formed of various shapes including, but not limited to, a barrel shape.

The second lens holding member 4 includes a holding frame 4a to hold the second lens group G2. The second lens holding member 4 is housed in the fixed barrel 9, and moves in an axial line direction. For example, the second lens holding member 4 may move in a direction of the optical axis (A). A plurality of guide pins may be installed on an outer surface of the holding frame 4a. The guide pins may be positioned one next to the other along a circumferential direction. The plurality of guide pins includes, but is not limited to, three guide pins.

The third lens holding member 5 has a holding frame 5a which holds the third lens group G3. The third lens holding member 5 is installed in front of the fourth lens holding member 6 to form a single body therewith. An iris unit 11 is installed on a back surface of the lens holding member 5 to adjust an opening of the aperture SP.

The fourth lens holding member 6 includes a holding frame 12, the holding barrel 13, and a focus actuator unit 14. The holding frame 12 holds the fourth lens group G4, and the holding barrel 13 is supported by the holding frame 12. The focus actuator unit 14 includes a voice coil motor (VCM), which may displaceably drive the holding frame 12 in the optical axis direction. The holding barrel 13 is housed in the fixed barrel 9. The holding barrel 13 may move in the axial line direction with respect to the fixed barrel 9. A plurality of guide pins are installed in a line along the circumferential direction on an outer surface of the holding barrel 13. The plurality of guide pins may include, but is not limited to, three guide pins The fifth lens holding member 7 includes a holding frame 15, a support frame 16 and an actuator unit 17. The holding frame 15 holds the fifth lens group G5. The support frame 16 supports the holding frame 15 so that the holding frame 15 moves within a surface orthogonal to the optical axis. The actuator unit 17 includes a piezoelectric element, including but not limited to, a piezoelectric transducer (PZT). Accordingly, the piezoelectric element may displaceably drive the holding frame 15 in the direction orthogonal to the optical axis with respect to the support frame 16. The actuator unit 17, for example, may reduce a shaking effect of an image caused by a movement realized by the interchangeable lens 1a. The fifth lens holding member 7 is installed on a back surface of the lens holding member 6 to form a single body with the fourth lens holding member 6.

The sixth lens holding member 8 includes a holding frame 18, a support frame 19 and a lens axis adjustment device 20. The holding frame 18 holds the sixth lens group G6. The support frame 19 supports the holding frame 18 so that the holding frame 18 moves within a surface orthogonal to the optical axis. The lens axis adjustment device 20 adjusts a relative position of the holding frame 18 in the direction orthogonal to the optical axis with respect to the support frame 19. The support frame 19 is housed in the fixed barrel 9 to move in the axial line direction. A plurality of guide pins is installed in a line with respect to one another, and along the circumferential direction on an outer surface of the support frame 19. The plurality of guide pins includes, but is not limited to, three guide pins.

In at least one exemplary embodiment of the present general inventive concept, the fixed barrel 9 has a substantially cylindrical shape and supports the second through sixth lens holding members 4 through 8. Accordingly, the second through sixth lens holding members 4 through 8 may move in the optical axis direction. In more detail, a plurality of guide slits having straight line shapes extending parallel with the optical axis to be installed in a line in the circumferential direction in the fixed barrel 9. Each guide slits may be formed of various shapes including, but not limited to, a straight line shape. In addition, the plurality of guide slits includes, but is not limited to, three guide slits.

Referring to the fixed barrel 9, guide pins protrude from outer surfaces of the second through sixth lens holding members 4 through 8. The guide pins are inserted into the guide slits to moveably support the second through sixth lens holding members 4 through 8.

In at least one exemplary embodiment, the cam barrel 10 may have a substantially cylindrical shape and is installed on an outer surface of the fixed barrel 9. The fixed barrel 9 is housed in the cam barrel 10. In detail, a plurality of cam slits (not shown) may be installed in the cam barrel. Each cam slit may be positioned in line with one another along the circumferential direction so as to have curve shapes corresponding to movement traces of the second through sixth lens groups G2 through G6. The plurality of guide slits respectively correspond to the guide pins of the second through sixth lens holding members 4 through 8. Also, the cam barrel 10 is installed on the outer surface of the fixed barrel 9. Accordingly, the cam barrel 10 may be rotatable in the circumferential direction about the fixed barrel when the guide pins of the second through sixth lens holding members 4 through 8, which protrude from the guide slits of the fixed barrel 9, are inserted into the cam slits. In at least one exemplary embodiment, the plurality of cam slits includes, but is not limited to, three cam slits.

Referring further to the lens barrel 2 according to at least one exemplary embodiment of the present general inventive concept, the guide pins move in a respective guide slits, and move relative to the guide slits, and the cam slits in response to a rotation of the cam barrel 10. Also, the second through sixth lens holding members 4 through 8 move in the optical axis direction in the fixed barrel 9, and along a path defined by shapes of the cam slits.

An interchangeable lens 1*a* according to at least one exemplary embodiment of the present general inventive concept may include various units installed in the lens barrel 2 including, but not limited to, an apparatus to manually and/or automatically perform focusing, an apparatus to sense vibration, such as hand shaking, and an apparatus to install a single-lens reflex (SLR) camera.

According to at least one exemplary embodiment of the present general inventive concept, when the interchangeable lens 1*a* is installed in an SLR camera, a user may rotate the cam barrel 10 of the lens barrel 2 to move the second through sixth lens groups G2 through G6 in the optical axis direction so as to perform zooming. In addition, when performing zooming, the fourth lens group G4 may move along the optical axis direction. The interchangeable lens 1*a* may move the fifth lens group G5 in the direction orthogonal to the optical axis direction to reduce an image shaking caused by shaking realized by the interchange lens 1*a*. For example, the shaking may be caused by shaking of a user's hand, a vibration of a support structure supporting the camera, etc.

Figure 2:
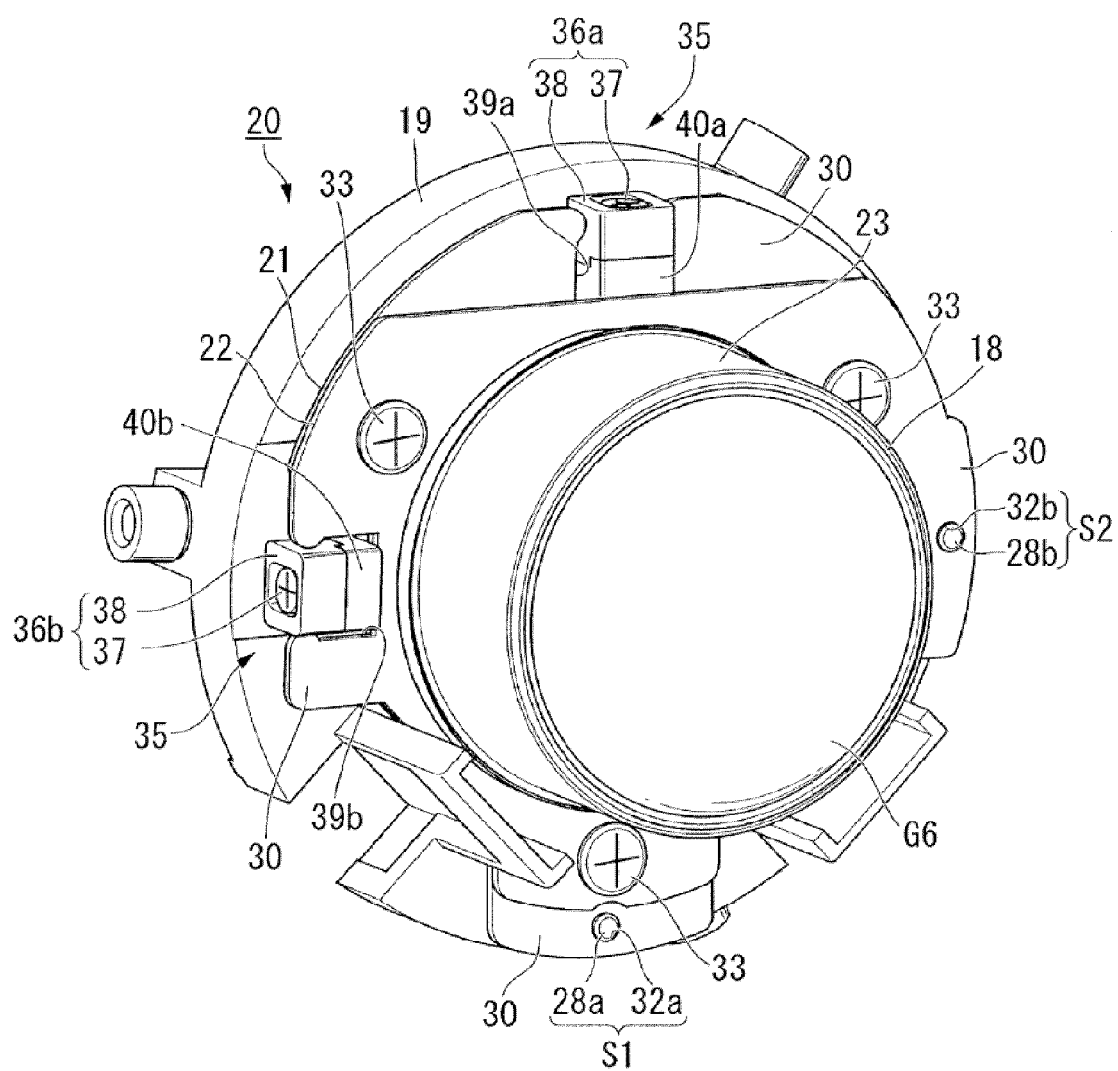
FIG. 2 is a perspective view illustrating an external appearance of a lens axis adjustment device of the interchangeable lens of FIG. 1.
Figure 3:
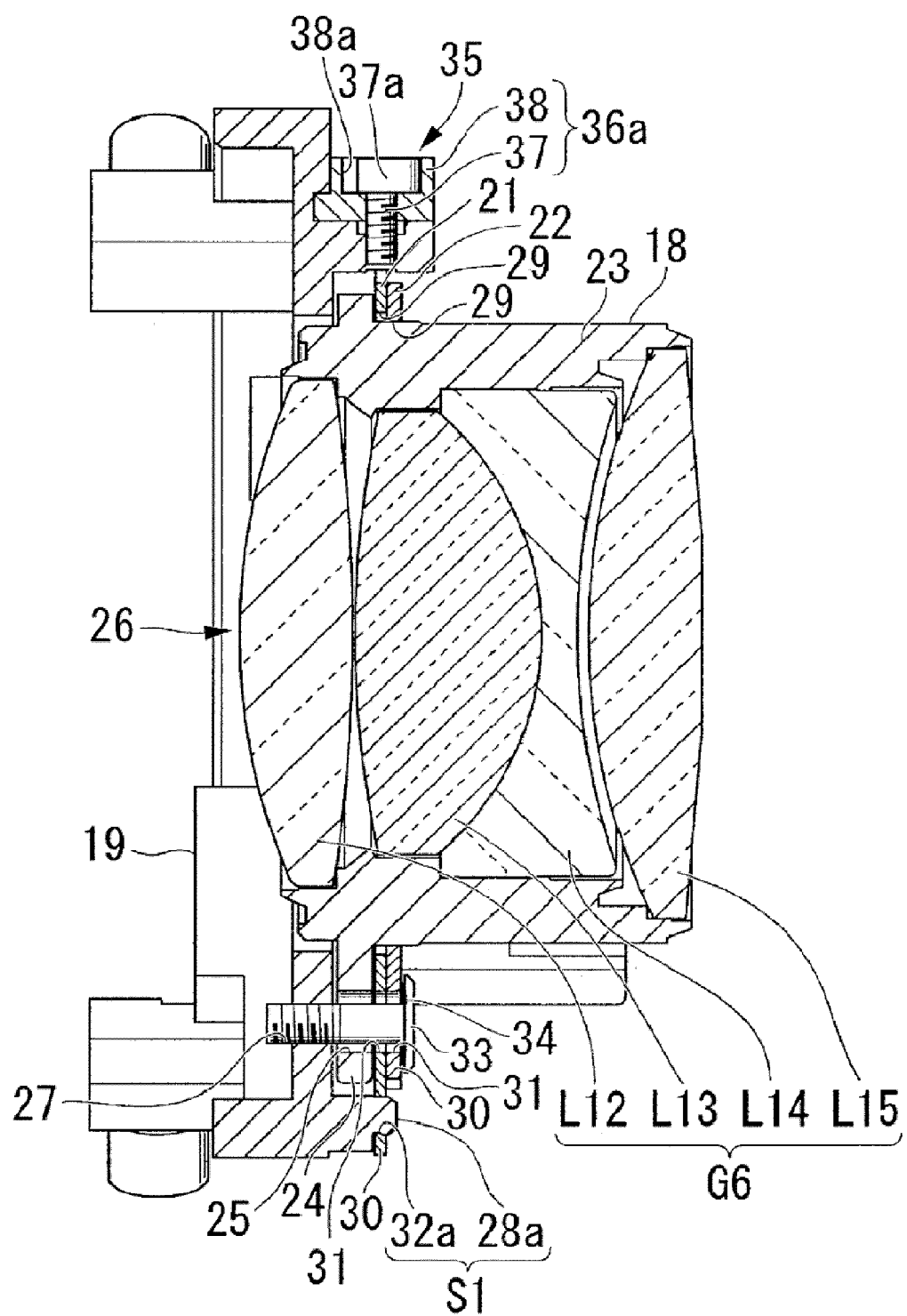
FIG. 3 is a cross-sectional view of the lens axis adjustment device of FIG. 2.
Figure 4:
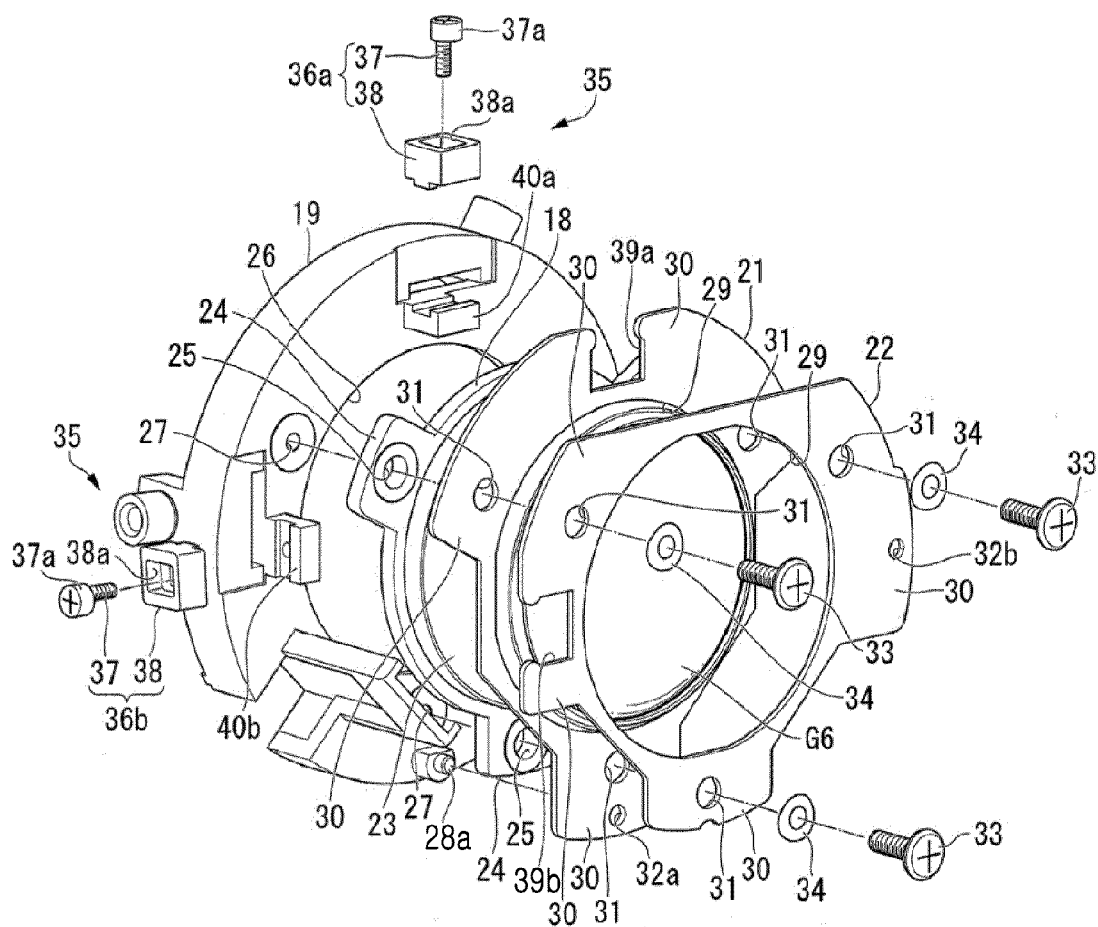
FIG. 4 is an exploded perspective view of the lens axis adjustment device of FIG. 2 seen on a side.
Figure 5:
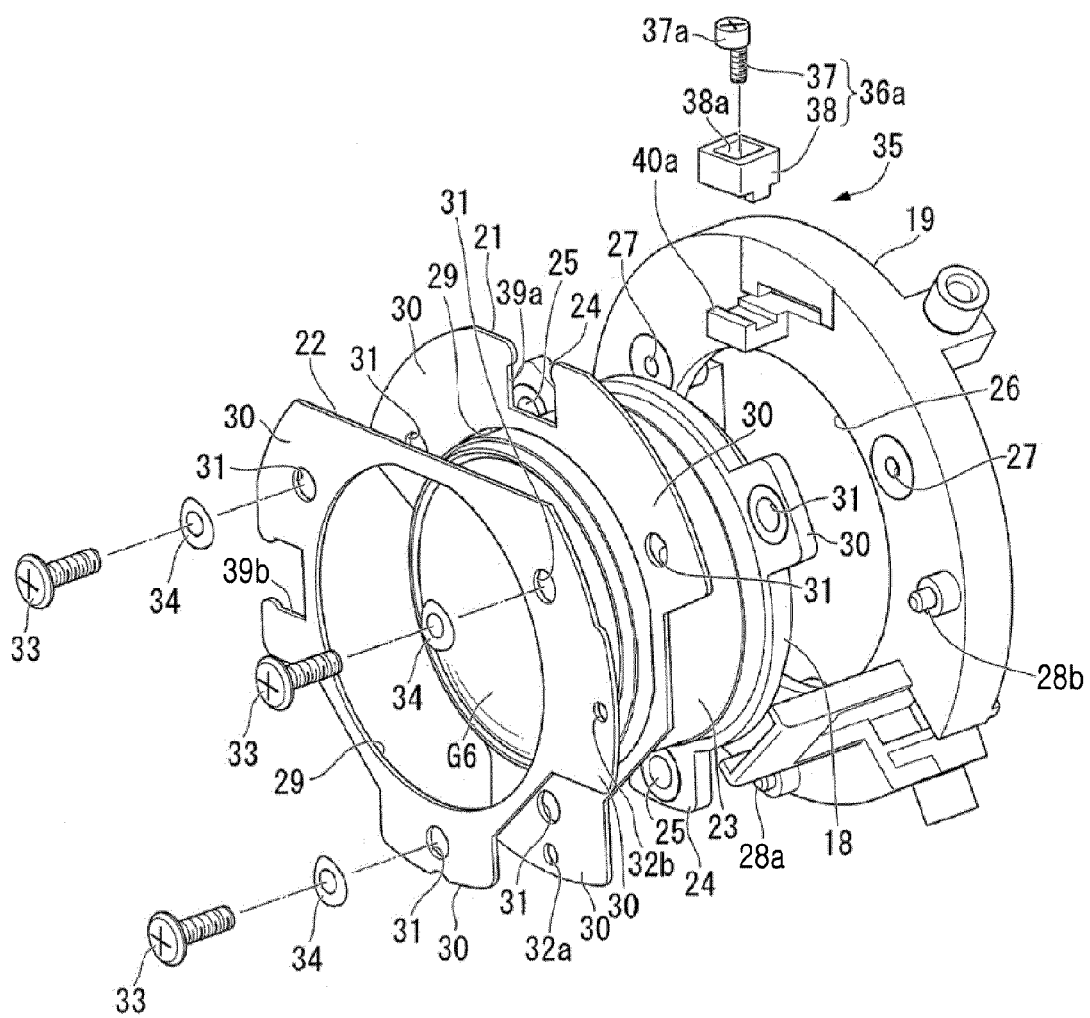
FIG. 5 is an exploded perspective view of the lens axis adjustment device of FIG. 2 seen from an opposite side viewed in FIG. 4.

The interchange lens 1*a* according to at least one exemplary embodiment of the present general inventive concept may include a lens axis adjustment device 20. The lens axis adjustment device 20 will now be described with reference to FIGS. 2 through 5. FIG. 2 is a perspective view illustrating an external appearance of the lens axis adjustment device 20. FIG. 3 is a cross-sectional view of the lens axis adjustment device 20. FIG. 4 is an exploded perspective view of the lens axis adjustment device 20 seen on a side (on the left side of the drawing). FIG. 5 is an exploded perspective view of the lens axis adjustment device 20 seen on the other side (on the right side of the drawing).

As shown in FIGS. 2 through 5, the lens axis adjustment device 20 includes the holding frame 18, the support frame 19, a first rotating member 21, and a second rotating member 22. The holding frame 18 holds the sixth lens group G6. The support frame 19 faces the holding frame 18, and supports the hold frame 18 so that the holding frame 18 moves within a facing surface.

The first rotating member 21 faces the support frame 19 and is supported thereby. Further the rotating member 21 holds the holding frame 18, and is rotatable around a first point S1 formed at a surface of the first rotating member 21 and facing the support frame 19. The second rotating member 22 also faces the support frame 19 is supported thereby. The second rotating member 22 also supports the holding frame 18, and is rotatable around a second point S2 formed at the surface of the second rotating member 22, and facing the support frame 19. The first and second rotating members 21, 22 may be rotated independently of one another to move the holding frame 18 and adjust mismatch between one or more lenses and the optical axis (A), as discussed further below.

The holding frame 18 includes a barrel shape part 23 which holds the sixth lens group G5, a flange part 24 which protrudes from an outer surface of the barrel shape part 23 facing the support frame 19, and a plurality of through-holes 25 which are formed in the flange part 24. The plurality of through-holes 25 may include, but is not limited to, three through-holes.

The support frame 19 includes an opening 26, a plurality of screw holes 27, a first axial part 28*a*, and a second axial part 28*b*. The opening 26 positions the sixth lens group G6 to face outward. The plurality of screw holes 27 are located outside the opening 26. The plurality of screw holes 27 includes, but is not limited to, three screw holes. The first and second axial parts 28*a* and 28*b* are located in positions corresponding to the first and second points S1 and S2.

The first and second rotating members 21 and 22 include respective frame parts 29, which hold the barrel shape part 23 of the holding frame 19. The first and second rotating members 21 and 22 further include a flange part 30 and a plurality of through-holes 31. The flange part 30 protrudes from the frame parts 29. Each of the plurality of through-holes 31 are formed in the flange parts 30. The first and second rotating members 21 and 22 also include first and second axial holes 31*a* and 32*b*, which is described further below.

The barrel shape part 23 of the holding frame 18 is positioned inside the opening 26 of the support frame 19. Accordingly, the flange part 24 is brought in contact with a surface of the support frame 19 facing the flange part 24, so as to be rotatably installed within the surface of the support frame 19.

The first rotating member 21 inserts the barrel shape part 23 of the holding frame 18 into a vertical parallel part of a frame part 29 and combines the first axial part 28*a* of the support frame 19 into the first axial hole 32*a* with the holding frame 18 overlapping the flange parts 24 and 30, so as to be rotatable around the point S1 on the facing surface of the support frame 19.

The second rotating member 22 inserts the barrel shape part 23 of the holding frame 18 into a horizontal parallel part of the frame part 29 and combines the second axial part 28*b* of the support frame 19 into the second axial hole 32*b* with the first rotating member 21 overlapping the flange part 30*s*, so as to be rotatable around the second point S2 on the facing surface of the support frame 19.

The first and second points S1 and S2 form an angle with respect to one another. Accordingly, an optical axis (A) of the sixth lens group G6 may be interposed between the first and second points S1 and S2. In at least one exemplary embodiment of the present general inventive concept, the angle between the first and second points S1, S2 is 90 degrees.

The first point S1 may be positioned on a vertical line, which traverses along the optical axis of the sixth lens group G6. In at least one exemplary embodiment, the first point S1 is positioned under the sixth lens group G6 so that the optical axis of the sixth lens group G6 is interposed therebetween. Therefore, the first rotating member 21 may rotate around the first point S1 to move the holding frame 18 (i.e., the sixth lens group G6) housed in the first rotating member 21 in a first direction, such as a yawing direction within a surface facing the support frame 19. The yawing direction may include a left/right shaking direction.

The second point S2 is positioned on a horizontal line, which travels along the optical axis of the sixth lens group G6. In at least one exemplary embodiment, the second point S2 is positioned on a right side of the sixth lens group G6 of FIG. 2 so that the optical axis of the sixth lens group G6 is interposed between the first and second points S1 and S2. Therefore, in the lens axis adjustment device 20, the second rotating member 22 may rotate around the second point S2 to move the holding frame 18 (i.e., the sixth lens group G6) housed in the second rotating member 22 in a second direction, such as a pitching direction, within the surface facing the support frame 19.

The lens axis adjustment device may also include a fixing unit 41, a pressurizing unit, 43 and rotation adjustment unit 45. The fixing unit 41 fixes the holding frame 18, the first rotating member 21, and the second rotating member 22 to the support frame 19. In other words, the lens axis adjustment device 20 has a structure in which screws 33 having smaller diameters than through-holes 25 and 31 are inserted into the screw holes 27 through the through-holes 25 and 31 of the flange parts 23 and 30 which overlap with one another in order to fix the holding frame 18 and the first and second rotating members 21 and 22 to the support frame 19.

The pressurizing unit 43 pressurizes the holding frame 18 and the first and second rotating members 21 and 22 toward the surface facing the support frame 19. In other words, the lens axis adjustment device 20 interposes spring washers 34 between the screw holes 27 and the screws 33 combined into the screw holes 27 to pressure the holding frame 18 and the first and second rotating members 21 and 22 toward the support frame 19.

The lens axis adjustment device 20 adjusts fastening strengths of the screws 33 with respect to the screw holes 27 so that the holding frame 18 maintains a position thereof in the optical axis by a pressurization force of the spring washers 34. Here, the holding frame 18 moves within the surface facing the support frame 19 according to the rotations of the first and second rotating members 21 and 22. In other words, the holding frame 18 and the first and second rotating members 21 and 22 are semi-fixed to the support frame 19 at least before they are adjusted.

In the lens axis adjustment device 20, because the screws 33 are moveably inserted into the through-holes 31 of the first and second rotating members 21 and 22, the first and second rotating members 21 and 22 may rotate within a range in which the screws 33 relatively move in the through-holes 31.

The rotation adjusting device 35 adjusts positions of rotation directions of the first and second rotating members 21 and 22. More specifically, the adjusting device 35 includes a pair of adjusting members i.e., a first adjusting member 36a and a second adjusting member 36b, which are rotatably installed on the outer surface of the support frame 19. The first and second adjusting members 36a and 36b include eccentric coupling members 37, including but not limited to an eccentric screw 37. The eccentric screw 37 includes eccentric parts 37a eccentric with respect to a central axis. Coupling members 38 including coupling holes 38a are provided, through which the eccentric screws 37 pass are coupled thereto.

With respect to the adjusting member 36a, the eccentric screw 37 is inserted into a screw hole of a protrusion 40a formed on the support frame 19. Accordingly, the coupling member 38 may be coupled with a concave part 39a formed in an outer surface of the first rotating member 21 so that the optical axis of the sixth lens group G6 is interposed between the first point S1 and the adjusting member 36a. With respect to the adjusting member 36b, the eccentric screw 37 is inserted into a screw hole of a protrusion 40b formed in the support frame 19. Accordingly, the coupling member 38 is combined with a concave part 39b formed in an outer surface of the second rotating member 22 so that the optical axis of the sixth lens group G6 is interposed between the first point S1 and the adjusting member 36b.

In further regards to the adjusting device 35, if the eccentric screws 37 of the adjusting members 36a and 36b rotate, the eccentric parts 37a of the eccentric screws 37 move relatively in the holes 38a of the coupling members 38. Accordingly, positions of the coupling member 38 on the protrusion 40b may be adjusted. Therefore, since the first and second rotating members 21 and 22 rotate by the movements of the coupling members 38 combined with the concave parts 39a and 39b, the positions of rotation directions of the first and second rotating members 21 and 22 are adjustable.

The lens axis adjustment device 20 having the above-described structure can perform a relative position adjustment in a direction orthogonal to the optical axis of the sixth lens group G6 at a high precision, by a simple structure of that the holding frame 18 moves within the surface facing the support frame 19 according to the rotation operation of anyone of the first and second rotating plates 21 and 22.

Also, a lens axis adjustment device 20 according to at least one exemplary embodiment of the present general inventive concept allows a user to easily perform an adjustment operation of the optical axis mismatch of the sixth lens group G6, by rotating the eccentric screws 37 of the adjusting members 36a and 36b described above. In particular, even after the lens axis adjustment device 20 is inserted into the lens barrel 2, it is possible to easily perform an adjustment of the optical axis mismatch of the sixth lens group G6 with the eccentric screws 37 of the adjusting members 36a and 36b operated to rotate, through an adjusting device from openings (not shown) formed in the fixed barrel 9 and the cam barrel 10. Also, when a user performs an adjustment while viewing, through a monitor, an image of a chart captured by a zoom lens of the lens barrel 2, it is possible to operate, e.g., rotate, the eccentric screws 37 of the adjusting members 36a and 36b described above.

The present general inventive concept is not limited to the above-described exemplary embodiment but may be variously modified without departing from the scope of the present general inventive concept.

The lens axis adjustment device 20 as an example has a configuration in which the axial parts 28a and 28b are provided in the support frame 19 and the axial holes 32a and 32b are provided in the first and second rotating members 21 and 22, but the lens axis adjustment device 20 may have a configuration in which the axial holes 32a and 32b are provided in the support frame 19 and the axial parts 28a and 28b are provided in the first and second rotating members 21 and 22.

Also, in the lens axis adjustment device 20, the adjusting members 36a and 36b, as an example, are provided in the support frame 19 and the concave parts 39a and 39b are provided in the first and second rotating members 21 and 22, but the concave parts 39a and 39b may be provided in the support frame 19 and the adjusting members 36a and 36b may be provided in the first and second rotating members 21 and 22.

The above lens axis adjustment device 20 has a configuration that allows a center adjustment operation in response to rotating the eccentric screws 37 of the adjusting members 36a and 36b. However, the present general inventive concept is not limited to a structure of the adjusting device 35 but may use any apparatus capable of adjusting the positions of the rotation directions of the first and second rotating members 21 and 22. Also, the lens axis adjustment device 20 may have a configuration in which a user performs the axis adjusting operation described above by directly rotating the first and second rotating members 21 and 22 without requiring adjustment of adjusting device 35.

In the above-described exemplary embodiment, an axis adjustment device of the present general inventive concept may be applied to the lens axis adjustment device 20 installed in the sixth lens holding member 8. However, the axis adjustment device of the present general inventive concept may adjust an optical axis mismatch of one or a lens group of the plurality of lenses L1 through L5 constituting the zoom lens. The axis adjustment device of the present general inventive concept is not limited to the above-described lenses, or any particular group of lenses, but may adjust an optical axis mismatch of an optical device such as an optical filter or the like.

In the above-described exemplary embodiment, the present general inventive concept is applied to the interchangeable lens 1, which may be utilized with the SLR camera. However, the present general inventive concept may be widely applied to a photographing apparatus including a lens shutter camera, a digital camera, a video camera, etc., an optical apparatus including an image projecting apparatus such as a projector, and a lens barrel including the optical apparatus.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An axis adjustment device comprising:
   a holding member to hold an optical device;
   a support member to face the holding member, and to support the holding member so that the holding member moves within a surface facing the support member;
   a first rotating member to face the support member and to hold the holding member, and supported rotatably around a first point provided on the surface facing the support member; and
   a second rotating member to face the support member and to hold the holding member, and supported rotatably around a second point provided on the surface facing the support member,
   wherein:
   the holding member moves within the surface facing the support member according to the rotation operation of any one of the first and second rotating members, so that a relative position adjustment is performed in a direction orthogonal to an optical axis of the optical device.

2. The axis adjustment device of claim 1, further comprising:
   a fixing means to fix the holding member and the first and second rotating members to the support member.

3. The axis adjustment device of claim 2, wherein:
   the holding member comprises a holding frame to hold the optical device, a flange part to protrude from the holding frame, and a plurality of through-holes to be formed in the flange part,
   the first and second rotating members comprise frame parts to hold the holding frame of the holding member, flange parts to protrude from the frame parts, and a plurality of through-holes to be formed in the flange parts,
   the support member comprises an opening to force the optical device to face outside and a plurality of screw holes to be formed outside of the opening, and
   the fixing means fastens screws having smaller diameters than through-holes of the flange parts into the screw holes through the through-holes so that the holding member and the first and second rotating members are fixed to the support member.

4. The axis adjustment device of claim 3, further comprising:
   a pressurizing means to pressurize the first and second rotating members toward the surface facing the support member.

5. The axis adjustment device of claim 4, wherein spring washers are interposed between the screw holes and the screws fastened into the screw holes so that the pressurizing means pressurizes the holding member and the first and second rotating members toward the support member.

6. The axis adjustment device of claim 1, wherein the first and second rotating members comprise at least one of axial holes and axial parts, which are combined with at least one respective axial parts and axial holes positioned at first and second points of the support member, to be rotatably installed at the support member.

7. The axis adjustment device of claim 1, wherein the first and second points are disposed to form a right angle so that an optical axis of the optical device is positioned between the first and second points.

8. The axis adjustment device of claim 1, further comprising:
   an adjusting means to adjust positions of rotation directions of the first and second rotating members.

9. The axis adjustment device of claim 8, wherein:
   the adjusting means comprises an adjusting member to be rotatably installed on an outer circumferential part of the support member,
   wherein the adjusting member comprises an eccentric part disposed eccentric with respect to a rotation center thereof, and moves the first and second rotating members toward the rotation directions by rotating in a state of being coupled with concave parts formed in an outer circumferential part of the first and second rotating members.

10. The axis adjustment device of claim 9, wherein, in the adjusting member, a first point of the first rotating member and a second point of the second rotating member are coupled with concave part formed in outer circumferential part of opposite side respectively, with the axis of the optical device being interposed therebetween.

11. The axis adjustment device of claim 10, wherein the adjusting member further comprises:
   an eccentric pin to be rotatably installed at the support member; and
   a coupling member including a through hole through which the eccentric pin passes so as to be coupled with the concave part.

12. A lens barrel comprising:
a lens barrel body in which a plurality of lenses are arranged in an optical axis;
a lens holding member to hold some lenses or lens groups of the plurality of lenses; and
a lens axis adjustment device to perform a relative position adjustment in a direction orthogonal to an optical axis of the lens holding member,
wherein the lens barrel comprises:
   a holding member to hold an optical device;
   a support member to face the holding member, and to support the holding member so that the holding member moves within a surface facing the support member;
   a first rotating member to face the support member and to hold the holding member, and supported rotatably around a first point provided on the surface facing the support member; and
   a second rotating member to face the support member and to hold the holding member, and supported rotatably around a second point provided on the surface facing the support member,
   wherein:
   the holding member moves within the surface facing the support member according to the rotation operation of any one of the first and second rotating members, so that a relative position adjustment of a lens included with the lens barrel is performed in the direction orthogonal to the optical axis of the optical device.

13. The lens barrel of claim 12, wherein the adjustment by the lens axis adjustment device is performed via an opening formed in the lens barrel body.

14. An optical apparatus comprising:
a lens unit including a plurality of lenses; and
a lens barrel to support the plurality of lenses, the lens barrel further comprising:
   a lens barrel body in which the plurality of lenses are arranged in an optical axis;
   a lens holding member to hold some lenses or lens groups of the plurality of lenses; and
   a lens axis adjustment device to perform a relative position adjustment in a direction orthogonal to an optical axis of the lens holding member,
   wherein the lens barrel comprises:
      a holding member to hold an optical device;
      a support member to face the holding member, and to support the holding member so that the holding member moves within a surface facing the support member;
      a first rotating member to face the support member and to hold the holding member, and supported rotatably around a first point provided on the surface facing the support member; and
      a second rotating member to face the support member and to hold the holding member, and supported rotatably around a second point provided on the surface facing the support member,
      wherein:
      the holding member moves within the surface facing the support member according to the rotation operation of any one of the first and second rotating members, so that a relative position adjustment of a lens included with the lens barrel is performed in the direction orthogonal to the optical axis of the optical device.

15. The optical apparatus of claim 14, wherein the adjustment by the lens axis adjustment device is performed via an opening formed in the lens barrel body.

16. The lens-axis adjustment device of claim 1, wherein the optical axis is interposed between an angle formed by the first and second points.

17. The axis adjustment device of claim 16, wherein the angle between the first and second points is 90 degrees.

* * * * *